United States Patent [19]

Brown

[11] Patent Number: 4,746,302
[45] Date of Patent: May 24, 1988

[54] INSULATING BOLT

[76] Inventor: Charles E. Brown, 9222 Benchley, Houston, Tex. 77099

[21] Appl. No.: 941,591

[22] Filed: Dec. 22, 1986

[51] Int. Cl.⁴ ............... H01R 4/66; H01R 13/648
[52] U.S. Cl. ........................... 439/95; 439/98; 439/565
[58] Field of Search .............. 174/48, 51; 411/417, 411/437; 439/92, 95, 96–98, 542, 543, 564, 565, 583

[56] References Cited

U.S. PATENT DOCUMENTS 2,828,662  4/1958  Antal ........................... 411/437
4,577,076  3/1986  Whelan ......................... 174/48 X

FOREIGN PATENT DOCUMENTS 655055  12/1928  France ......................... 411/437

Primary Examiner—Eugene F. Desmond
Attorney, Agent, or Firm—Marett & Marett

[57] ABSTRACT

An insulating bolt is disclosed herein for use in supporting signs on walls comprising a hollow threaded shaft having a channel disposed on the shaft to receive a grounding strap which is laid in the channel. The end of the grounding strap conforms to the end of the shaft of the bolt for engaging into the end of an armored cable thus providing grounding means from the sign back to the power source. A slide locking nut having a raised shoulder for sliding in the channel is provided for positioning and holding the bolt in place.

16 Claims, 3 Drawing Sheets 4,746,302

INSULATING BOLT

BACKGROUND OF THE INVENTION

1. Field of the Invention

The present invention relates generally to bolts and more particularly is concerned with an apparatus for supporting illuminated signs on walls, providing means for supplying electricity to the signs and providing a built-in grounding means for the sign through the bolt itself.

2. Description of the Prior Art

Display signs have been used by merchants for years to display their business name, merchandise or whatever they wish to display. As technology advanced, merchants began using illuminated signs. A typical illuminated sign is composed of a U-shaped bracket, also known as a raceway, which supports the neon tube inside the raceway. The open end of the raceway is covered with translucent plastic or fabric. Illuminated signs are often hung on the walls of buildings by suitable support means well known in the art. A problem existed in supporting the sign and at the same time running the electrical wires from inside the building through the wall to the sign safely and still providing a grounding means for the sign. This problem has plagued the electrical conduit business for years.

One attempt to solve this problem is illustrated in FIG. 1 wherein is shown a prior art apparatus currently in use comprising a hollow plastic bolt 1 having a threaded shaft 2. The bolt further has a head 3 rigidly attached on one end, a spacer nut 4 and a lock nut 5 all threadably engaged on the shaft 2. A hollow cable adapter 6 is provided for threadably engaging into the end of the shaft 2 by means of a threaded bore 7. The hollow cable adapter 6 has an extending shaft 8 with ridges 9 disposed thereon for threadably engaging into the armored cable 10. The electrical wire is then run from the building through the hollow shaft and into the sign as illustrated in FIG. 2.

While the above described apparatus has been used to meet the needs of the electrical conduit business, it has some serious drawbacks. One major drawback is the fact that the spacer nut 4 has to be screwed all the way up the shaft 2 to the head 3. Normally these plastic bolts are very long, and this process of screwing the spacer nut 4 all the way up the shaft is a very time consuming task and is also very tiring on one's hands. A second disadvantage of the prior art is that the electrical wires have to be first inserted through the conduit connector and then through the flexible metal conduit, which requires more time. Another major drawback of the prior art is that the hollow cable adapter 6 does not securely fit within the end of the flexible metal conduit 10 to form a tight and rigid connection. Perhaps the biggest disadvantage of the prior art is that there are no means to provide grounding of the electrical sign with the bolt. Underwriters' Laboratory requires all signs to be grounded directly back to the source of power. The prior art does not teach this. In practice, a separate wire is run from the sign to the flexible conduit, which is not acceptable by Underwriters' Laboratory or any electrical code.

Consequently, a need exists for improvements in the prior art which will overcome these drawbacks.

SUMMARY OF THE INVENTION

The present invention provides an apparatus designed to satisfy the aforementioned needs not heretofore anticipated by the prior art. Ease of installation is accomplished by incorporating a pair of opposed channels running the length of a threaded bolt shaft. A threadless slide locking nut having a raised shoulder within can be so positioned so that the raised shoulder will slide into the channel thus permitting the slide locking nut to be very quickly moved down the shaft of the bolt to the desired location. The slide locking nut is then rotated and the raised shoulder engages the threads on the bolt shaft thus securing the nut in place. It is not necessary to screw the nut all the way down the bolt shaft thus saving installation time. A grounding strap is positioned within one channel running the length of the bolt. A grounding screw is connected through one end of the grounding strap into the back of the raceway of the sign and the other end of the grounding strap conforms to the end of the bolt shaft thereby allowing the bolt and the grounding strap to be threadably engaged directly into the end of the armored cable thus eliminating the need for an adapter and providing an integral grounding means for the sign. The bolt may be made of any material, be of any length and incorporate any thread design.

BRIEF DESCRIPTION OF THE DRAWINGS

The invention will be hereinafter more fully described with reference to the accompanying drawings in which.

DESCRIPTION OF THE PREFERRED EMBODIMENT

Figure 1:
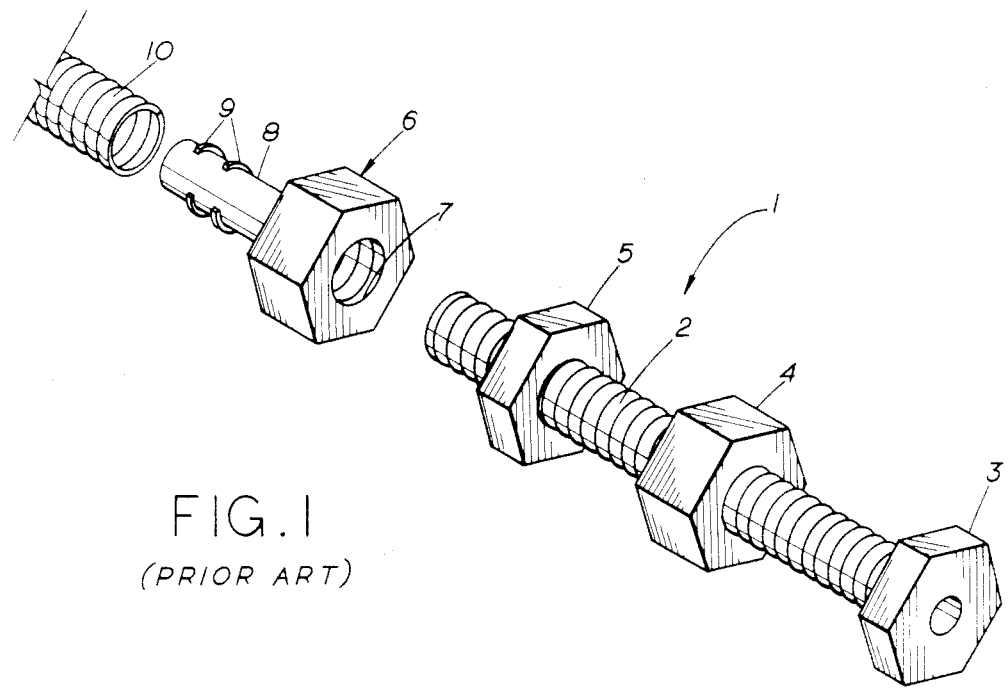
FIG. 1 is an isometric view of a prior art apparatus.
Figure 2:
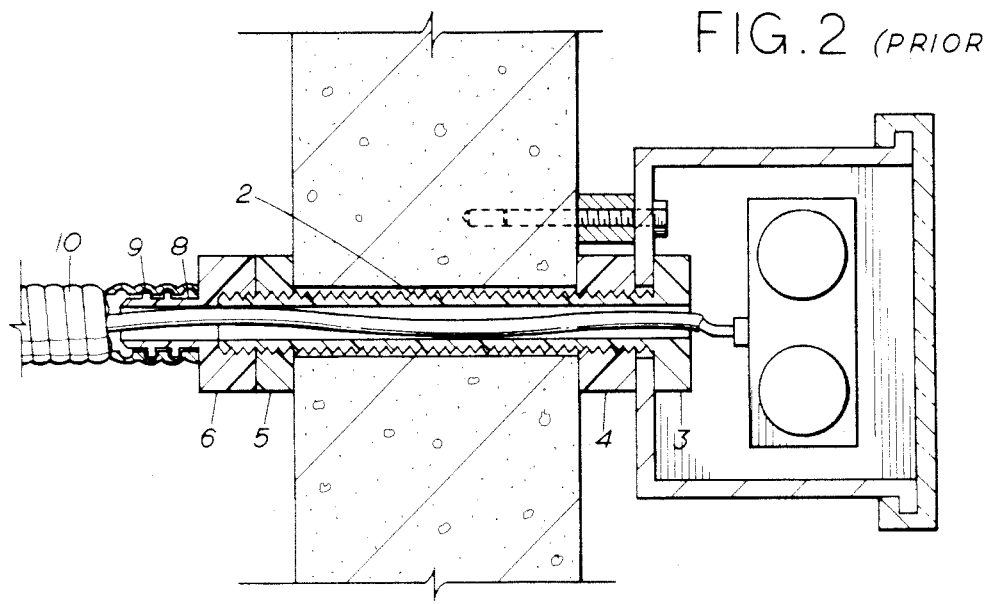
FIG. 2 is a cross-sectional view of the prior art bolt showing how it attaches a raceway of the sign onto a wall.
Figure 3:
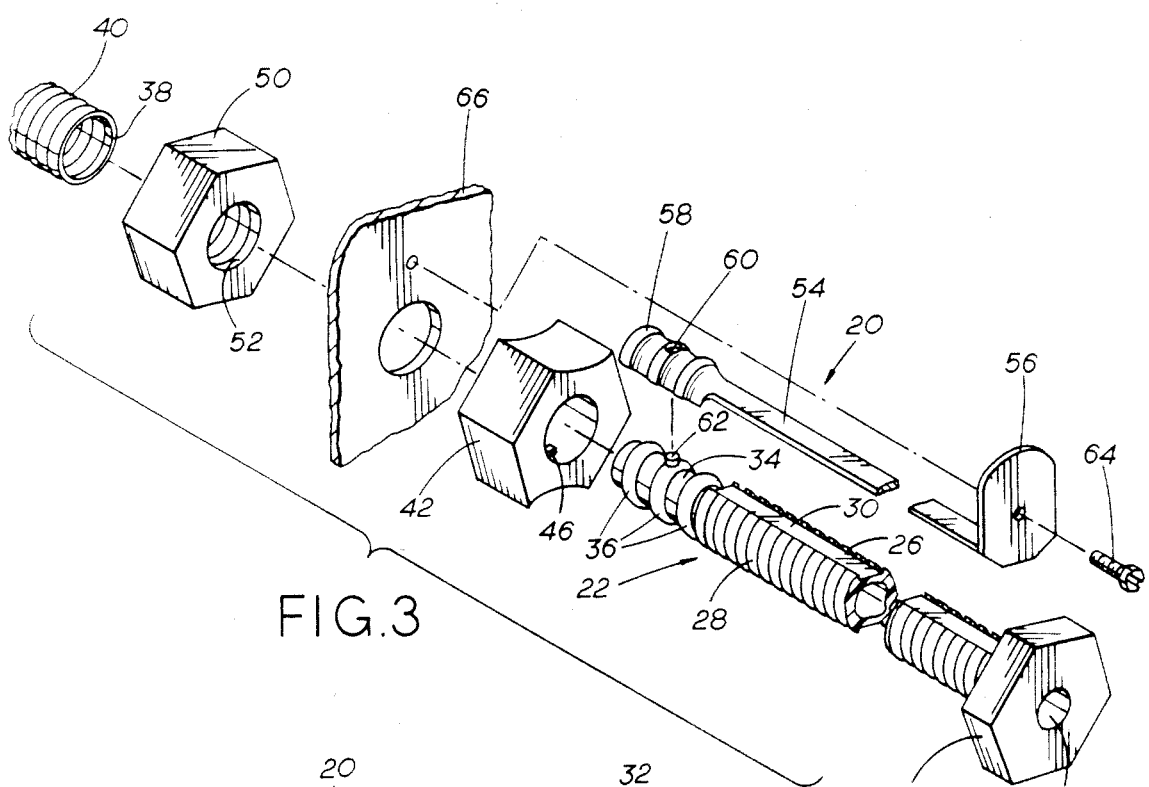
FIG. 3 is an exploded isometric view of the present invention.
Figure 4:
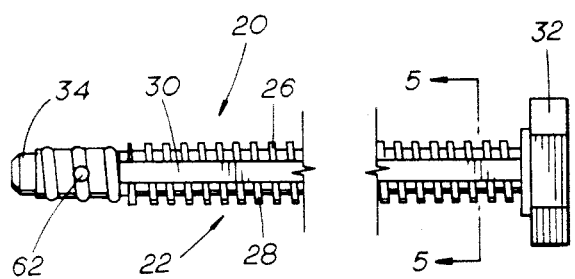
FIG. 4 is a side-elevation view of the present invention.
Figure 5:
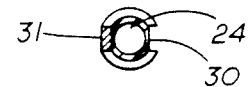
FIG. 5 is a cross-sectional view of the bolt shaft taken along lines 5—5 of FIG. 4.
Figure 6:
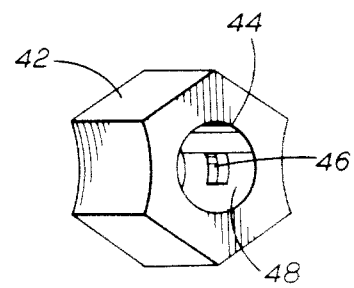
FIG. 6 is an isometric view of the slide locking nut showing the raised shoulder therein.
Figure 7:
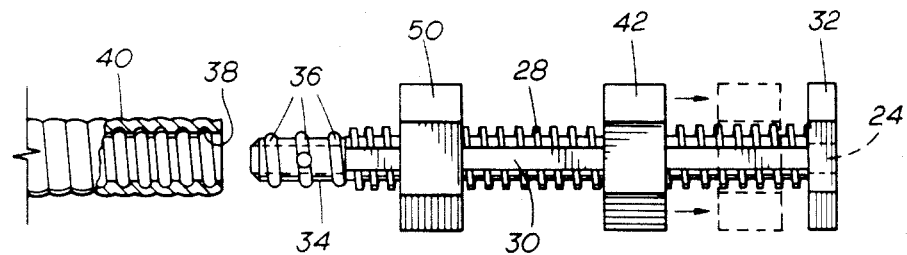
FIG. 7 is a side-elevation view of the present invention showing the operation of the slide locking nut, a second securing nut threadably engaged on the threads of the bolt shaft and further illustrating the end of the bolt having threads which threadably engage into the end of the armored cable.

Referring now to the drawings, and more particularly to FIGS.'s 3 through 8, there is shown an insulating bolt 20 comprising a shaft 22 having a hollow bore 24 within and threads 26 and 28 engaged thereon. The shaft 22 has a first channel 30 and a second channel 31 diametrically opposing each other. Two channels are preferred but it would be obvious that one channel could suffice. The shaft 22 further has a flared end 32, e.g., a bolt head, secured on one end of the shaft 22. On the second end 34 of the shaft 22 are engaging threads 36 for engaging the internal threads 38 of the armored cable 40. It is to be noted that threads 26, 28 and 36 could be all of the same type. A securing means 42, e.g., a slide locking nut, is provided with an opening 44 therein further having a protruding member 46 on the inside surface 48 of the opening 44. The securing means 42 is placed on the shaft 22 with the protruding member 46 positioned within either first channel 30 or second channel 31. The securing means 42 can then be slid along the shaft 22 to the desired location and then rotated around the shaft 22 causing the protruding member 46 to engage the threads 28 in a locking and tight relationship. A securing nut 50 having threads 52 which match threads 26 and 28 can be threadably engaged on the shaft 22. A grounding means 54 having a first end 56 and a second end 58 is provided for placement on the shaft 22 within the first channel 30. Second end 58 has a hole 60 which engages a boss 62 on the end 34 of the shaft 22. The boss 60 allows the grounding means 50 to snap onto the insulating bolt 20. The second end 58 conforms with the end 34. A grounding screw 64 engages through first end 56 and into the back of the first member 66, e.g., the raceway of the sign for a positive ground connection.

Figure 8:
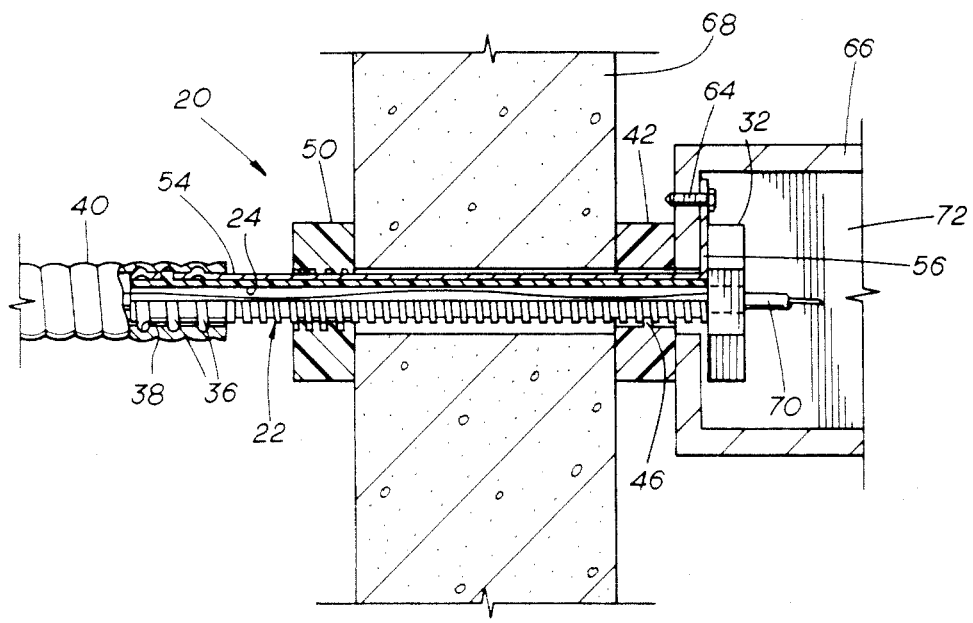
FIG. 8 illustrates the present invention with the grounding strap in place holding a sign to a wall and allowing the electrical wires to pass through the wall and into the sign raceway.

FIG. 8 illustrates the present invention securing the first member 66, e.g., the raceway of the sign, securely to a second member 68, e.g., a wall. The securing means 42, e.g., a slide locking nut, has been positioned between the first member 66, e.g., a raceway of the sign, and a second member 68, e.g., the wall, and secured in position by means of the protuding member 46. The securing nut 50 is positioned on the other side of the wall 68 and tightened to a snug fit thus holding the shaft 22 within the wall 68. Engaging threads 36 are shown engaged within the internal threads 38 of the armored cable 40. An electrical conduit 70 is shown placed through the hollow bore 24 and extend into the sign 72 for connecting to the neon tube (not shown).

While the invention has been described with reference to a preferred embodiment, it would be obvious to one skilled in the art that modifications and variations of the invention may be constructed and employed without departing from the scope of the invention. The scope of the invention is defined in the following claims.

I claim:

1. Apparatus for securing a first member having an opening therein to a second member having an opening therein, said apparatus for further attaching to a third threaded member, comprising:
   a threaded shaft comprised of electrically non-conducting material for passage through the openings in the first and second members, having one end thereof flared for placement against the first member, and having a channel extending from one end of said shaft along the length thereof to said flared end, said threaded shaft for threaded attachment to the third threaded member;
   securing means having an opening therein for communicating along the length of said threaded shaft, and having a protruding member attached to said securing means and protruding into the opening in said securing means for communicating with the channel in said threaded shaft, rotatable about said threaded shaft so that the protruding member is movable from a first position communicating with the channel to a second position communicating with the threads in said threaded shaft;
   electrical grounding means for placement in the channel in said threaded shaft, communicating between the first member and the third threaded member.

2. Apparatus as recited in claim 1 wherein said electrical grounding means is attachable to the first member.

3. Apparatus as recited in claim 1 wherein said electrical grounding means is attachable to said threaded shaft.

4. Apparatus as recited in claim 1 wherein said electrical grounding means is attachable to the first member and to said threaded shaft.

5. Apparatus for securing a first member having an opening therein to a second member having an opening therein, said apparatus for further attaching to a third threaded member, comprising:
   a threaded hollow shaft comprised of electrically non-conducting material for passage through the openings in the first and second members, having one end thereof flared for placement against the first member, and having a channel extending from one end of said shaft along the length thereof to said flared end, said threaded shaft for threaded attachment to the third threaded member;
   securing means having an opening therein for communicating along the length of said threaded shaft, and having a protruding member attached to said securing means and protruding into the opening in said securing means for communicating with the channel in said threaded shaft, rotatable about said threaded shaft so that the protruding member is movable from a first position communicating with the channel to a second position communicating with the threads in said threaded shaft;
   electrical grounding means for placement in the channel in said threaded shaft, communicating between the first member and the third threaded member.

6. Apparatus as recited in claim 5 wherein said electrical grounding means is attachable to the first member.

7. Apparatus as recited in claim 5 wherein said electrical grounding means is attachable to said threaded shaft.

8. Apparatus as recited in claim 5 wherein said electrical grounding means is attachable to the first member and to said threaded shaft.

9. Apparatus for securing a first member having an opening therein to a second member having an opening therein, said apparatus for further attaching to a third threaded member, comprising:
   a threaded shaft comprised of electrically nonconducting material for passage through the opening in the first member, having one end thereof flared for placement against the first member, and having a channel extending from one end of said shaft along the length thereof to said flared end, said threaded shaft for threaded attachment to the third threaded member;
   a first securing means having an opening therein for communicating along the length of said threaded shaft, and having a protruding member attached to said first securing means and protruding into the opening in said first securing means for communicating with the channel in said threaded shaft, rotatable about said threaded shaft so that the protruding member is movable from a first position communicating with the channel to a second position communicating with the threads in said threaded shaft, for placement between the first and second members;

electrical grounding means for placement in the channel in said threaded shaft, communicating between the first member and the threaded third member.

10. Apparatus as recited in claim 9 wherein said electrical grounding means is attachable to the first member.

11. Apparatus as recited in claim 9 wherein said electrical grounding means is attachable to said threaded shaft.

12. Apparatus as recited in claim 9 wherein said electrical grounding means is attachable to the first member and to said threaded shaft.

13. Apparatus for securing a first member having an opening therein to a second member having an opening therein, said apparatus for further attaching to a third threaded member, comprising:
- a threaded hollow shaft comprised of electrically nonconducting material for passage through the opening in the first member, having one end thereof flared for placement against the first member, and having a channel extending from one end of said shaft along the length thereof to said flared end, said threaded shaft for threaded attachment to the third threaded member;
- a first securing means having an opening therein for communicating along the length of said threaded shaft, and having a protruding member attached to said first securing means and protruding into the opening in said first securing means for communicating with the channel in said threaded shaft, rotatable about said threaded shaft so that the protruding member is movable from a first position communicating with the channel to a second position communicating with the threads in said threaded shaft, for placement between the first and second members;
- electrical grounding means for placement in the channel in said threaded shaft, communicating between the first member and the threaded third member.

14. Apparatus as recited in claim 13 wherein said electrical grounding means is attachable to the first member.

15. Apparatus as recited in claim 13 wherein said electrical grounding means is attachable to said threaded shaft.

16. Apparatus as recited in claim 13 wherein said electrical grounding means is attachable to the first member and to said threaded shaft.

* * * * *